(12) United States Patent
Pan et al.

(10) Patent No.: US 12,434,637 B2
(45) Date of Patent: Oct. 7, 2025

(54) VEHICLE BRACKET AND VEHICLE DEVICE

(71) Applicant: PRIMAX ELECTRONICS LTD., Taipei (TW)

(72) Inventors: Yung-Tai Pan, Taipei (TW); Chih-Wei Hu, Taipei (TW); Shih-Hung Yu, Taipei (TW); Wen-Pin Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 182 days.

(21) Appl. No.: 18/409,834

(22) Filed: Jan. 11, 2024

(65) Prior Publication Data

US 2025/0170967 A1   May 29, 2025

(30) Foreign Application Priority Data

Nov. 29, 2023   (TW) .................. 112146416

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01)

(58) Field of Classification Search
None
See application file for complete search history.

(56) References Cited

U.S. PATENT DOCUMENTS

| 4,836,482 | A | * | 6/1989 | Sokol | B60R 11/02 248/206.3 |
| 5,316,362 | A | * | 5/1994 | McGuinness | B60J 3/0213 296/97.9 |
| 2015/0097013 | A1 | * | 4/2015 | Rawlings | H04N 23/57 224/567 |
| 2022/0324303 | A1 | * | 10/2022 | Johananoff | B60R 11/00 |
| 2023/0271552 | A1 | * | 8/2023 | Sloterbeek | B60R 1/088 348/148 |
| 2025/0091516 | A1 | * | 3/2025 | Tu | H01Q 1/2291 |

FOREIGN PATENT DOCUMENTS

GB          449273 A * 6/1936 ............... B60J 1/04

\* cited by examiner

*Primary Examiner* — Steven M Marsh
(74) *Attorney, Agent, or Firm* — WPAT, PC

(57) ABSTRACT

A vehicle bracket includes a base, a connecting piece and a fixing piece. A first surface of the base is configured to face a mounting surface. The base has a set of pivoting portions and a set of abutting portions on a second surface thereof. The set of abutting portions is configured to abut against a portion of a vehicle device. A first end of the connecting piece is rotationally and pivotally connected to the set of pivoting portions, and a second end thereof has a rod portion protruding laterally from the connecting piece. The rod portion is configured to be inserted into a guide groove of the vehicle device, so that the rod portion is limited to slide in the guide groove. The fixing piece is configured to fix the set of abutting portions and the portion of the vehicle device to each other.

10 Claims, 5 Drawing Sheets

VEHICLE BRACKET AND VEHICLE DEVICE

FIELD OF THE INVENTION

The present disclosure relates to a vehicle bracket and a vehicle device suitable for the vehicle bracket.

BACKGROUND OF THE INVENTION

Currently, a vehicle device such as a driving recorder is usually assembled on an inner surface of a windshield or on a rear view mirror through a bracket. However, since a vehicle body vibrates during driving, when the driving recorder shakes too much, video images will be blurred, and it may even cause a structure between the bracket and the driving recorder to fracture. Therefore, the existing bracket suitable for the vehicle device such as the driving recorder still needs to be improved.

SUMMARY OF THE INVENTION

The present disclosure provides a vehicle bracket, which includes a base, a connecting piece and a fixing piece. The base has a first surface and a second surface opposite to each other. The first surface is configured to face a mounting surface. The base has a set of pivoting portions and a set of abutting portions disposed on the second surface. The set of abutting portions is configured to abut against a portion of a vehicle device. The connecting piece has a first end and a second end opposite to each other, in which the first end of the connecting piece is rotationally and pivotally connected to the set of pivoting portions, and the second end of the connecting piece has a rod portion protruding laterally from the connecting piece. The rod portion is configured to be inserted into a guide groove of the vehicle device, so that the rod portion is limited to slide in the guide groove to adjust an angle between the connecting piece and the base. The fixing piece is configured to fix the set of abutting portions and the portion of the vehicle device to each other.

In some embodiments of the present disclosure, an extension direction of the connecting piece is substantially perpendicular to an axial direction of the rod portion.

In some embodiments of the present disclosure, a length of the rod portion is smaller than a width of the connecting portion.

In some embodiments of the present disclosure, a width of the rod portion is smaller than a width of the connecting portion.

The present disclosure also provides a vehicle device for detachable assembly on the above-mentioned vehicle bracket. The vehicle device includes a cover and a structural piece. The cover has the guide groove disposed on an upper surface of the cover. The structural piece is located in the cover, in which the structural piece has a portion protruding laterally from the cover, and the portion of the structural piece is configured to abut against the set of abutting portions.

In some embodiments of the present disclosure, the cover has a bent portion disposed on the upper surface of the cover to define the guide groove.

In some embodiments of the present disclosure, a length direction of the guide groove is substantially perpendicular to an axial direction of the rod portion.

In some embodiments of the present disclosure, a length of the guide groove is less than a length of the connecting piece.

In some embodiments of the present disclosure, the structural piece is a heat dissipation member.

In some embodiments of the present disclosure, the vehicle device is a driving recorder.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
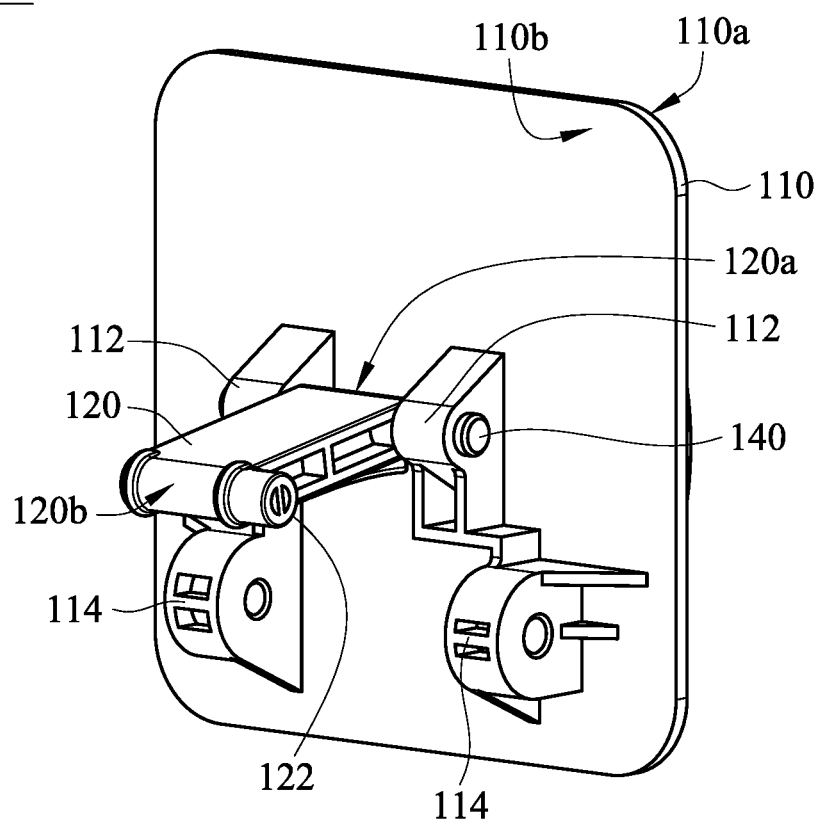
FIG. 1 is a perspective view of a vehicle bracket according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, since a vehicle body vibrates during driving, when the driving recorder shakes too much, video images will be blurred, and it may even cause a structure between the bracket and the driving recorder to fracture. Therefore, the present invention provides a novel vehicle bracket, which includes a base, a connecting piece and a fixing piece. The connecting piece (or called cantilever beam structure) connected between the vehicle device and the base can disperse shaking and impact force on the vehicle device caused by the vibration of the vehicle body during driving, and thus in addition to reducing a shaking amplitude of the vehicle device, it can also prevent structural fracture of a structure between the bracket and the driving recorder. In addition, the vehicle bracket of the present invention also has quick assembly and quick disassembly functions to facilitate the user's assembly and disassembly. On the other hand, the present invention provides a vehicle device suitable for the above-mentioned vehicle bracket. Various embodiments of the vehicle bracket and the vehicle device of the present invention will be described in detail below.

Figure 2:
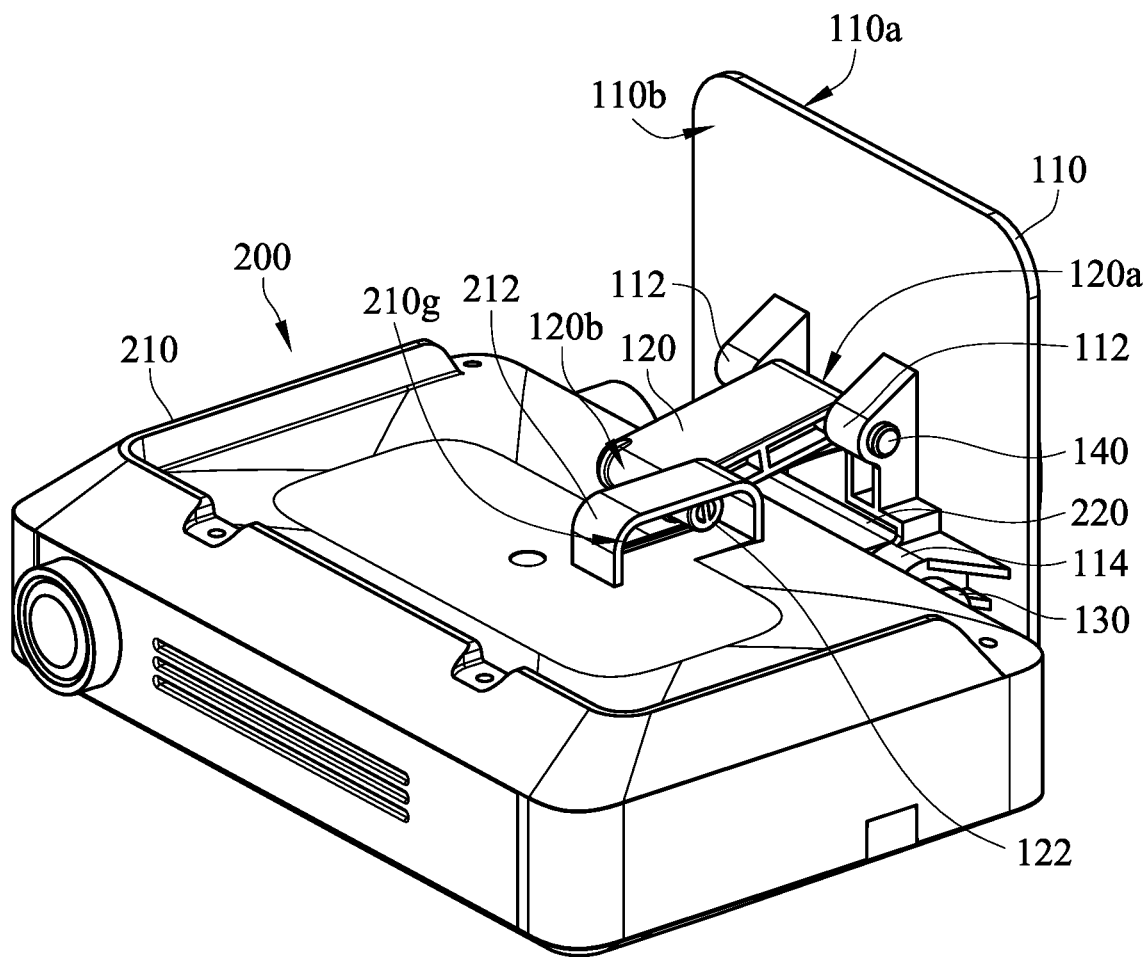
FIG. 2 is a perspective view of a vehicle bracket and a vehicle device according to an embodiment of the present invention.
Figure 3:
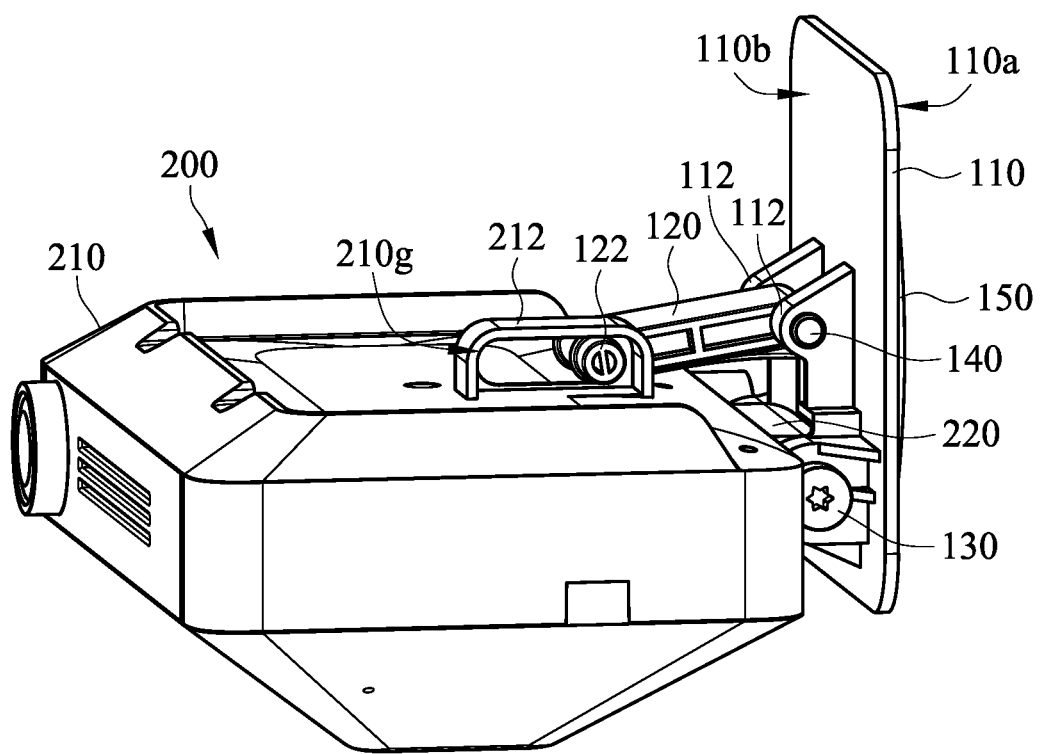
FIG. 3 is a perspective view of the vehicle bracket and the vehicle device of FIG. 2 from another perspective.

FIG. 1 is a perspective view of a vehicle bracket according to an embodiment of the present invention. FIG. 2 is a perspective view of a vehicle bracket and a vehicle device according to an embodiment of the present invention. FIG. 3 is a perspective view of the vehicle bracket and the vehicle device of FIG. 2 from another perspective. As shown in FIGS. 1, 2 and 3, the vehicle bracket 100 includes a base 110, a connecting piece 120 and a fixing piece 130.

The base 110 has a first surface 110a and a second surface 110b opposite to each other. The first surface 110a is configured to face a mounting surface (e.g., an inner surface of a windshield). In some embodiments, please refer to FIG. 3, the first surface 110a may be connected to the mounting surface through an adhesive layer 150. However, the present invention is not limited to the foregoing embodiments, and the first surface 110a may be fixed on the mounting surface through other methods.

As shown in FIGS. 1 to 3, the base 110 has a set of pivot portions 112 and a set of abutting portions 114 disposed on the second surface 110b. The set of abutting portions 114 is configured to abut against a portion of a vehicle device 200 (e.g., a portion of a structural piece 220 of the vehicle device 200 shown in FIG. 3). In some embodiments, as shown in FIG. 1, one of the set of pivot portions 112 and one of the set of abutting portions 114 are connected to each other.

The connecting piece 120 has a first end 120a and a second end 120b opposite to each other. The first end 120a is close to the base 110, and the second end 120b is away from the base 110. The first end 120a of the connecting piece 120 is rotationally and pivotally connected to the set of pivoting portions 112, for example, through a pivoting shaft 140. The second end 120b of the connecting piece 120 has a rod portion 122 protruding laterally from the connecting piece 120 (a side surface of the connecting piece 120).

In some embodiments, an extending direction of the connecting piece 120 is substantially perpendicular to an axial direction of the rod portion 122. In some embodiments, a length of the rod portion 122 is less than a width of the connecting piece 120. In some embodiments, a width of the rod portion 122 is less than the width of the connecting piece 120.

The rod portion 122 is configured to be inserted into a guide groove 210g of the vehicle device 200, so that the rod portion 122 is limited to slide in the guide groove 210g to adjust an angle between the connecting piece 120 and the base 110. When the rod portion 122 is limited to slide in the guide groove 210g, in addition to adjusting the angle between the connecting piece 120 and the base 110, the angle between the base 110 and the vehicle device 200 may be adjusted, and thus to let a camera of the vehicle device 200 such as the driving recorder can be aimed in a specific direction, for example, the camera can be aimed at the front/rear of the car.

The fixing piece 130 is configured to fix the set of abutting portions 114 and the portion of the vehicle device 200 (e.g., the portion of the structural piece 220 shown in FIG. 3) to each other. In some embodiments, the fixing piece 130 is a screw (e.g., a spindle screw) or another suitable fixing piece.

Figure 4:
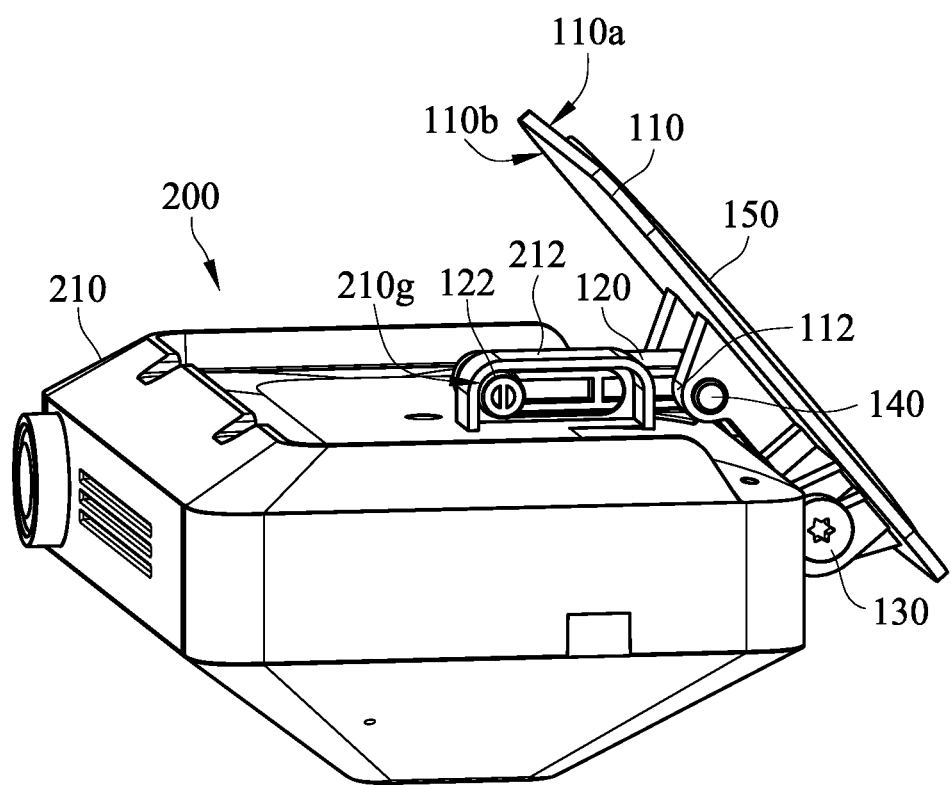
FIG. 4 is a perspective view of a vehicle bracket and a vehicle device according to an embodiment of the present invention.

FIG. 4 is a perspective view of a vehicle bracket and a vehicle device according to an embodiment of the present invention. The differences between FIG. 4 and FIG. 3 are that the angle between the connecting piece 120 and the base 110 in FIG. 4 (less than 90 degrees) is different from the angle between the connecting piece 120 and the base 110 in FIG. 3 (more than 90 degrees), and the angle between the base 110 and the vehicle device 200 in FIG. 4 (less than 90 degrees) is different from the angle between the base 110 and the vehicle device 200 in FIG. 3 (about 90 degrees).

The following describes how to assemble the vehicle device 200 of the present invention. Please refer to FIGS. 1 to 4. After the user obtains the vehicle bracket 100 and the vehicle device 200, the user can insert the rod portion 122 of the connecting piece 120 of the vehicle bracket 100 into the guide groove 210g of the vehicle device 200, and then contact (abut) the portion of the vehicle device 200 (e.g., the portion of the structural piece 220) between the set of abutting portions 114 of the base 110 of the vehicle bracket 100, and then insert the fixing piece 130 (e.g., the screw) into openings of the set of abutting portions 114 and an opening of the portion of the vehicle device 200 (e.g., the portion of the structural piece 220). Afterwards, the rod portion 122 can slide forward and backward in the guide groove 210g to adjust the angle between the connecting piece 120 and the base 110 and the angle between the base 110 and the vehicle device 200. After the adjustment is completed, the fixing piece 130 is locked, and the vehicle device 200 can be firmly assembled on the mounting surface through the vehicle bracket 100. As such, the shaking and impact force to the vehicle device 200 caused by the vibration of the vehicle body during driving can be dispersed by the connecting piece 120 (or called the cantilever beam structure), which can effectively reduce the shaking amplitude of the vehicle device 200, and thus can avoid fracture near the portion of the vehicle device 200 (e.g., near the portion of the structural piece 220).

The following describes how to disassemble the vehicle device 200 of the present invention. When the user wants to remove the vehicle device 200 from the vehicle bracket 100, the user only needs to take out the fixing piece 130, and then move the portion of the vehicle device 200 (e.g., the portion of the structural piece 220) away from the set of abutting portions 114, and then move the vehicle device 200 away from the rod portion 122 to remove the vehicle device 200.

As can be seen from the above, it is quite convenient for the user to assemble the vehicle device 200 on the vehicle bracket 100 or to disassemble the vehicle device 200 from the vehicle bracket 100 without having to screw or unscrew a plurality of screws.

Figure 5:
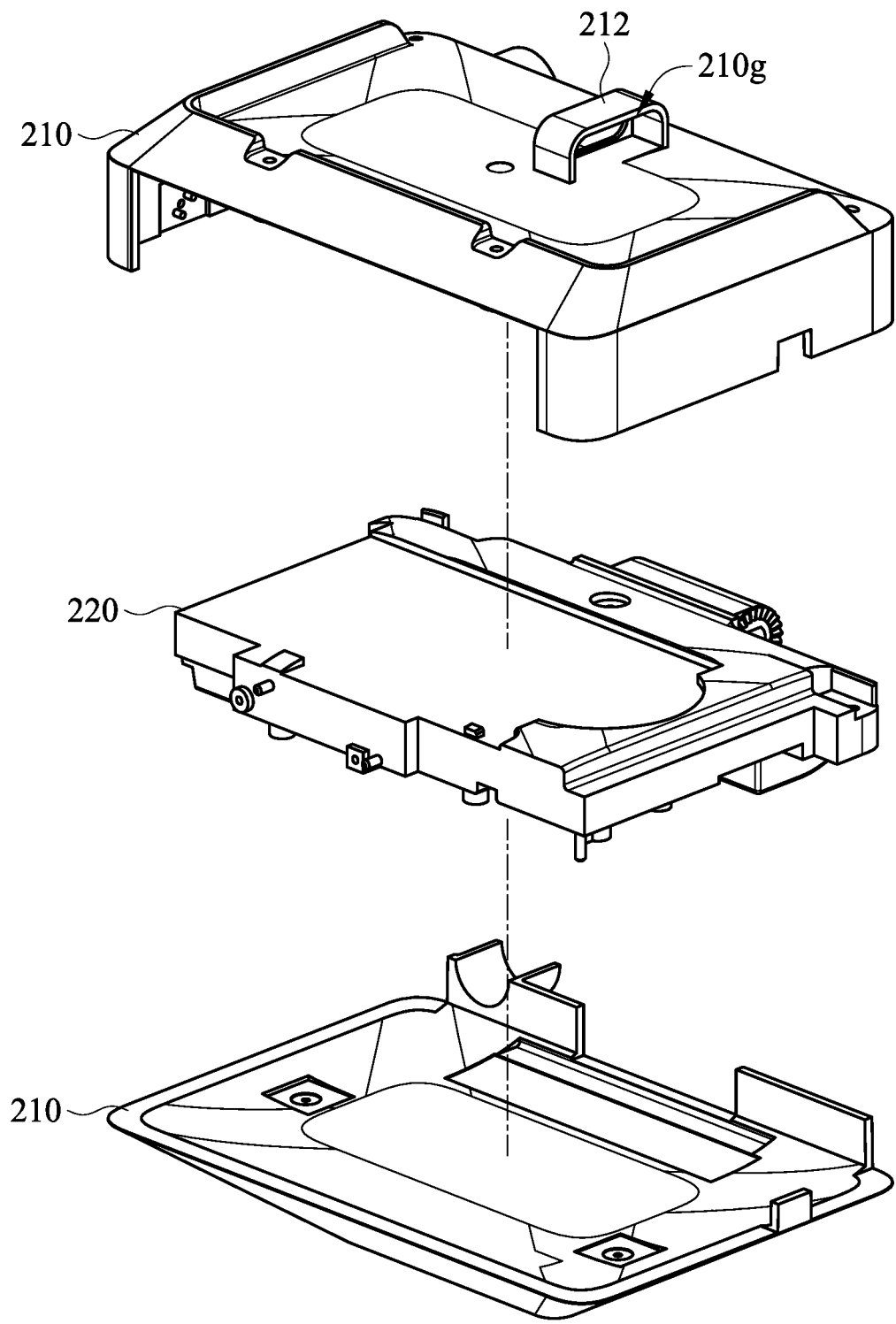
FIG. 5 is an exploded perspective view of a vehicle device according to an embodiment of the present invention.

The present invention further provides a vehicle device for detachable assembly on the above-mentioned vehicle bracket 100. FIG. 5 is an exploded perspective view of a vehicle device according to an embodiment of the present invention. As shown in FIG. 5, the vehicle device 200 includes a cover 210 and a structural piece 220. In some embodiments, the cover 210 includes an upper cover (not labeled) and a lower cover (not labeled). In some embodiments, the vehicle device 200 is a driving recorder.

The cover 210 has a guide groove 210g disposed on an upper surface of the cover 210. In some embodiments, the cover 210 has a bent portion 212 disposed on the upper surface of the cover 210 to define the guide groove 210g. However, the present invention is not limited to the foregoing embodiments. In other embodiments, the guide groove cooperating with the rod portion 122 may be defined by another component (not shown) or another structure (not shown) of the cover 210.

In some embodiments, a length direction of the guide groove 210g is substantially perpendicular to an axial direction of the rod portion 122 of the connecting piece 120 of the vehicle bracket 100 shown in FIG. 1. In some embodiments, a length of the guide groove 210g is less than a length of the connecting piece 120. In some embodiments, the guide groove 210g is a through opening. However, the present invention is not limited to the foregoing embodiments. In other embodiments, the guide groove may be a blind hole.

The structural piece 220 is located in the cover 210. The structural piece 220 has a portion protruding laterally from the cover 210 (a side surface of the cover 210). Please refer to FIG. 5 and FIGS. 1 and 2, the portion of the structural piece 220 is configured to abut against the set of abutting portions 114 of the base 110 of the vehicle bracket 100.

In some embodiments, please refer to FIG. 5, the structural piece 220 is a heat dissipation member, which is used to conduct heat generated when electronic components (not shown) in the vehicle device 200 are operating to the outside of the cover 210 of the vehicle device 200. In some embodiments, the structural piece 220 includes a metallic material. In some embodiments, a planar size of the structural piece 220 is substantially the same as a planar size of the cover 210, or a planar size of the structural piece 220 is slightly smaller than a planar size of the cover 210 to quickly absorb the heat generated when the electronic components (not shown) in the vehicle device 200 are operating.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A vehicle bracket, comprising:
a base, having a first surface and a second surface opposite each other, wherein the first surface is configured to face a mounting surface, and the base has a set of pivoting portions and a set of abutting portions disposed on the second surface, and the set of abutting portions is configured to abut against a portion of a vehicle device;
a connecting piece, having a first end and a second end opposite to each other, wherein the first end of the connecting piece is rotationally and pivotally connected to the set of pivoting portions, and the second end of the connecting piece has a rod portion protruding laterally from the connecting piece, and the rod portion is configured to be inserted into a guide groove of the vehicle device, so that the rod portion is limited to slide in the guide groove to adjust an angle between the connecting piece and the base; and
a fixing piece, configured to fix the set of abutting portions and the portion of the vehicle device to each other.

2. The vehicle bracket of claim 1, wherein an extension direction of the connecting piece is substantially perpendicular to an axial direction of the rod portion.

3. The vehicle bracket of claim 1, wherein a length of the rod portion is smaller than a width of the connecting portion.

4. The vehicle bracket of claim 1, wherein a width of the rod portion is smaller than a width of the connecting portion.

5. A vehicle device for detachable assembly on the vehicle bracket of claim 1, the vehicle device comprising:
a cover, having the guide groove disposed on an upper surface of the cover; and
a structural piece, located in the cover, wherein the structural piece has a portion protruding laterally from the cover, and the portion of the structural piece is configured to abut against the set of abutting portions.

6. The vehicle device of claim 5, wherein the cover has a bent portion disposed on the upper surface of the cover to define the guide groove.

7. The vehicle device of claim 5, wherein a length direction of the guide groove is substantially perpendicular to an axial direction of the rod portion.

8. The vehicle device of claim 5, wherein a length of the guide groove is less than a length of the connecting piece.

9. The vehicle device of claim 5, wherein the structural piece is a heat dissipation member.

10. The vehicle device of claim 5, wherein the vehicle device is a driving recorder.

* * * * *